United States Patent
Yamada et al.

(10) Patent No.: US 10,569,719 B2
(45) Date of Patent: Feb. 25, 2020

(54) DISPLAY HOLDER

(71) Applicant: Toyota Jidosha Kabushiki Kaisha, Toyota-shi, Aichi-ken (JP)

(72) Inventors: Takako Yamada, Nagoya (JP); Yasuhisa Fujiwara, Miyoshi (JP); Kuniaki Hasegawa, Kariya (JP); Yoshinari Maeda, Tajimi (JP); Yukinori Kawamura, Tajimi (JP)

(73) Assignee: Toyota Jidosha Kabushiki Kaisha, Toyota-shi, Aichi-ken (KR)

( * ) Notice: Subject to any disclaimer, the term of this patent is extended or adjusted under 35 U.S.C. 154(b) by 0 days.

(21) Appl. No.: 16/262,033

(22) Filed: Jan. 30, 2019

(65) Prior Publication Data

US 2019/0232884 A1 Aug. 1, 2019

(30) Foreign Application Priority Data

Feb. 1, 2018 (JP) .................................. 2018-016778

(51) Int. Cl.
*B60R 11/02* (2006.01)
*B60R 7/06* (2006.01)
*B60R 11/00* (2006.01)

(52) U.S. Cl.
CPC .......... *B60R 11/0235* (2013.01); *B60R 11/02* (2013.01); *B60R 11/0241* (2013.01); *B60R 11/0252* (2013.01); *B60R 2011/0003* (2013.01); *B60R 2011/0005* (2013.01); *B60R 2011/008* (2013.01); *B60R 2011/0075* (2013.01); *B60R 2011/0082* (2013.01);

(Continued)

(58) Field of Classification Search
CPC ....... B60R 2011/0005; B60R 2011/027; B60R 2011/0082; B60R 2011/0075; B60R 2011/008; B60R 2011/0084; B60R 2011/0085; B60R 11/02; B60R 11/0241; F16M 11/041
USPC ......................................... 224/549, 552, 929
See application file for complete search history.

(56) References Cited

U.S. PATENT DOCUMENTS 5,788,202 A * 8/1998 Richter ............... B60R 11/0241
224/570
6,056,175 A * 5/2000 Mieglitz ................ B60K 37/04
224/282

(Continued)

FOREIGN PATENT DOCUMENTS

DE 19719512 A1 * 11/1998 ......... B60R 11/0241
EP 2431229 A1 * 3/2012 ............. B60R 11/02

(Continued)

*Primary Examiner* — Justin M Larson
(74) *Attorney, Agent, or Firm* — Dinsmore & Shohl LLP

(57) ABSTRACT

A display holder includes a display mounting stand. The display mounting stand includes a holder, a rail, an arm, a first gear, a second gear, and a third gear. The second gear and the third gear are located between the arm and a first linear moving part. The second gear is coaxially coupled to the first gear through a hole extending through the first linear moving part. The third gear meshes with the second gear and a second rack so as to interlock movement in one direction of the rail relative to the holder with movement in the one direction of the arm relative to the rail. A first rack is located on a side wall extending in the one direction of the first support part. The second rack is located on a side wall extending in the one direction of the arm.

5 Claims, 5 Drawing Sheets

(52) U.S. Cl.
CPC ............... *B60R 2011/0084* (2013.01); *B60R 2011/0085* (2013.01); *B60R 2011/027* (2013.01)

(56) References Cited

U.S. PATENT DOCUMENTS

| | | | | |
|---|---|---|---|---|
| 6,988,907 B2 * | 1/2006 | Chang | ................ | B60R 11/0241 439/345 |
| 7,272,984 B2 * | 9/2007 | Fan | ................ | B60R 11/02 248/231.61 |
| 7,407,143 B1 * | 8/2008 | Chen | ................ | B60R 11/0241 248/309.1 |
| 7,537,190 B2 * | 5/2009 | Fan | ................ | B60R 11/02 248/309.1 |
| 7,708,328 B2 * | 5/2010 | Doom | ................ | B60R 7/06 206/565 |
| 7,967,269 B2 * | 6/2011 | Liu | ................ | G03B 21/58 248/176.3 |
| 8,567,737 B2 * | 10/2013 | Chen | ................ | F16M 11/041 248/313 |
| 8,675,888 B2 * | 3/2014 | Yoon | ................ | H04B 1/082 381/86 |
| 8,708,296 B2 * | 4/2014 | Nemoto | ................ | B60R 11/02 248/316.4 |
| 8,833,716 B2 * | 9/2014 | Funk | ................ | F16M 13/02 248/316.4 |
| 9,014,393 B2 * | 4/2015 | Huh | ................ | B60R 11/02 381/386 |
| 9,115,843 B2 * | 8/2015 | Huang | ................ | F16M 11/08 |
| 9,161,466 B2 * | 10/2015 | Huang | ................ | H05K 5/0204 |
| 9,469,253 B2 * | 10/2016 | Brunard | ................ | B60R 11/02 |
| 9,473,607 B2 * | 10/2016 | An | ................ | H04M 1/11 |
| 9,749,002 B1 * | 8/2017 | Fan | ................ | H04B 1/3888 |
| 9,797,543 B2 * | 10/2017 | Lin | ................ | E05B 73/0082 |
| 10,001,153 B1 * | 6/2018 | Fan | ................ | F16B 2/12 |
| 10,017,126 B2 * | 7/2018 | Lee | ................ | H04M 1/04 |
| 10,065,570 B2 * | 9/2018 | Dry | ................ | B60R 11/02 |
| 10,220,796 B2 * | 3/2019 | Neumann | ................ | B64D 11/00152 |
| 10,391,950 B2 * | 8/2019 | Vander Sluis | ................ | B60R 11/02 |
| 2006/0215836 A1 * | 9/2006 | Wang | ................ | H04M 1/04 379/455 |
| 2012/0312936 A1 * | 12/2012 | Huang | ................ | F16M 11/041 248/122.1 |
| 2013/0240587 A1 * | 9/2013 | Buchhalter | ................ | B60R 11/0241 224/570 |
| 2015/0343962 A1 * | 12/2015 | Le Leizour | ................ | B60R 11/02 361/809 |
| 2018/0345874 A1 * | 12/2018 | Thain | ................ | B60R 11/0241 |
| 2019/0232884 A1 * | 8/2019 | Yamada | ................ | B60R 11/0252 |
| 2019/0232885 A1 * | 8/2019 | Yamada | ................ | B60R 11/0235 |
| 2019/0329715 A1 * | 10/2019 | Yamada | ................ | B60R 11/0235 |

FOREIGN PATENT DOCUMENTS

| | | | | |
|---|---|---|---|---|
| FR | 2939998 A1 | * | 6/2010 | ......... B60R 11/0241 |
| FR | 3047701 A1 | * | 8/2017 | ............ B60K 37/04 |
| GB | 2563211 A | * | 12/2018 | ............ B60R 11/02 |
| JP | 2016-500353 A | | 1/2016 | |

* cited by examiner

DISPLAY HOLDER

CROSS-REFERENCE TO RELATED APPLICATIONS

This application claims priority to Japanese Patent Application No. 2018-016778 filed on Feb. 1, 2018, which is incorporated herein by reference in its entirety including the specification, drawings and abstract.

BACKGROUND

1. Technical Field

The present disclosure relates to a display holder accommodated in an instrument panel of a vehicle.

2. Description of Related Art

The above display holder includes a display mounting stand, and a display, such as a smartphone or a tablet computer, is placed on the display mounting stand. The display mounting stand is configured to be accommodated in an instrument panel or pulled out from the instrument panel in a laid-down state. The display mounting stand is pulled up from a pulled-out state, and then retains the display in an upright state (see Published Japanese Translation of PCT Application No. 2016-500353, for example).

SUMMARY

The display mounting stand includes an arm that holds edges of the display, and a linear movement mechanism combined with the arm. Linear movement of the arm by the linear movement mechanism enables the position of the arm to follow the edges of the display, and this configuration realizes holding of displays with various dimensions. Meanwhile, an impact caused by a vehicle collision might decouple the arm from the linear movement mechanism, which results in dropping of the display from the display holder. Hence, the display holder is desired to have enhanced impact resistance. The present disclosure provides a display holder capable of enhancing impact resistance.

An aspect of the present disclosure is a display holder including a display mounting stand configured to be accommodatable in an accommodating part located in an instrument panel of a vehicle. The display mounting stand includes: a holder; a rail; and an arm in a plate-like shape; a first gear; a second gear; and a third gear. The holder includes a first support part and a second support part. Each of the first support part and the second support part is in a plate-like shape and faces each other. The rail is held between the first support part and the second support part, and includes a first linear moving part and a second linear moving part. Each of the first linear moving part and the second linear part is in a plate-like shape and faces each other. The arm is held between the first linear moving part and the second linear moving part. The holder and the arm are configured to hold the display between the holder and the arm. The first support part, the first linear moving part, the arm, the second linear moving part, and the second support part are stacked in the order. The first gear is located between the first support part and the first linear moving part. The first gear meshes with a first rack included in the first support part. The second gear is located between the arm and the first linear moving part. The second gear is coaxially coupled to the first gear through a hole extending through the first linear moving part. The third gear is located between the arm and the first linear moving part. The third gear meshes with the second gear and a second rack included in the arm so as to interlock movement in one direction of the rail relative to the holder with movement in the one direction of the arm relative to the rail. The first rack is located on a side wall extending in the one direction of the first support part. The second rack is located on a side wall extending in the one direction of the arm.

According to the above configuration, the movement of the arm relative to the rail and the movement of the rail relative to the holder are mutually interlocked with each other in the same direction. Accordingly, it is possible to rapidly hold the display between the holder and the arm in accordance with the dimension of the display.

Herein, when an impact is applied onto the display holder, such an impact acts on the rail such that the rail is bent toward the first support part or toward the second support part. The impact also acts on the arm such that the arm is bent toward the first linear moving part or the second linear moving part. With respect to the point, the first rack and the second rack are located on the side walls extending in one direction, that is, the portions having resistance against the above bending. Accordingly, with the above configuration, it is possible to suppress positional deviations of the first rack and the second rack relative to the respective gears. As a result, the meshing between the first rack and the first gear as well as the meshing between the second rack and the second gear are suppressed from being released, to thereby enhance impact resistance in the display holder.

In the above display holder, the side wall of the first support part may include a linear projection projecting in the thickness direction of the first support part, and the side wall of the arm may include a linear projection projecting in the thickness direction of the arm.

The linear projection projecting in the thickness direction of the first support part has a structure to suppress the above-described bending, and the linear projection projecting in the thickness direction of the arm also has a structure to suppress the above-described bending. According to the above configuration, since the respective side walls on which the first rack and the second rack are located include the above linear projections, it is also possible to further suppress the meshing between the first rack and the first gear as well as the meshing between the second rack and the second gear from being out of engagement.

In the above display holder, the first rack may have teeth facing inward of the first support part, and the second rack may have teeth facing inward of the arm.

The above-described bending in the first support part 22 encourages a deformation such that the first support part 22 is pulled and stretched in one direction, thus displacing the first rack inward. The above-described bending of the arm encourages a deformation such that the arm is pulled and stretched in one direction, thus displacing the second rack inward. With respect to the point, according to the above configuration, the teeth of the first rack face inward of the first support part, and the teeth of the second rack face inward of the arm. Therefore, even if the above-described bending occurs, the deformation acts to maintain the meshing between the first rack and the first gear as well as maintain the meshing between the second rack and the second gear. Accordingly, it is possible to further suppress the meshing between the first rack and the first gear as well as the meshing between the second rack and the second gear from being out of engagement.

In the above display holder, the rail may include an arm restricting part that holds both sides of the arm and restricts movement of the arm to linear movement along the one direction. The holder may include a rail restricting part that holds both sides of the rail and restricts movement of the rail to linear movement along the one direction.

According to the above configuration, the movement of the arm relative to the rail is restricted by the arm restricting part to the linear movement along the one direction. The movement of the rail relative to the holder is restricted by the rail restricting part to the linear movement along the one direction. Accordingly, it is possible to effectively suppress the above meshing from being out of engagement, and also smoothly hold the display between the holder and the arm.

In the above display holder, the display holder may further include a lock mechanism that locks a position of the arm relative to the rail and releases the lock by operation on an operating part along the one direction.

According to the above configuration, the movement of the arm relative to the rail and the operation on the operating part enabling the movement are performed along the same direction. Accordingly, the movement of the arm, and the movement of the rail interlocked with the movement can be implemented by a user's intuitive operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, one embodiment of a display holder will be described with reference to FIG. 1 to FIG. 7.

Figure 1:
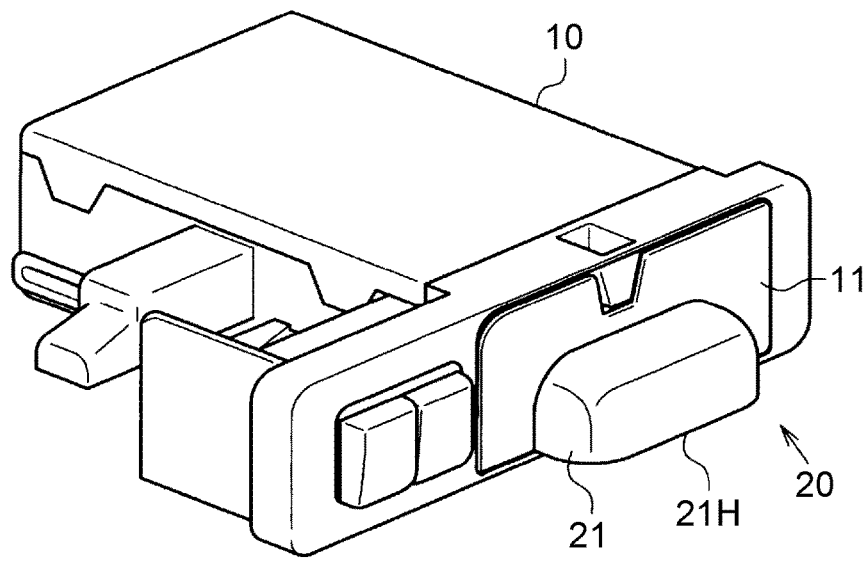
FIG. 1 is a view showing a structure in perspective view of a display holder of one embodiment, the display holder being in an accommodated state.
Figure 2:
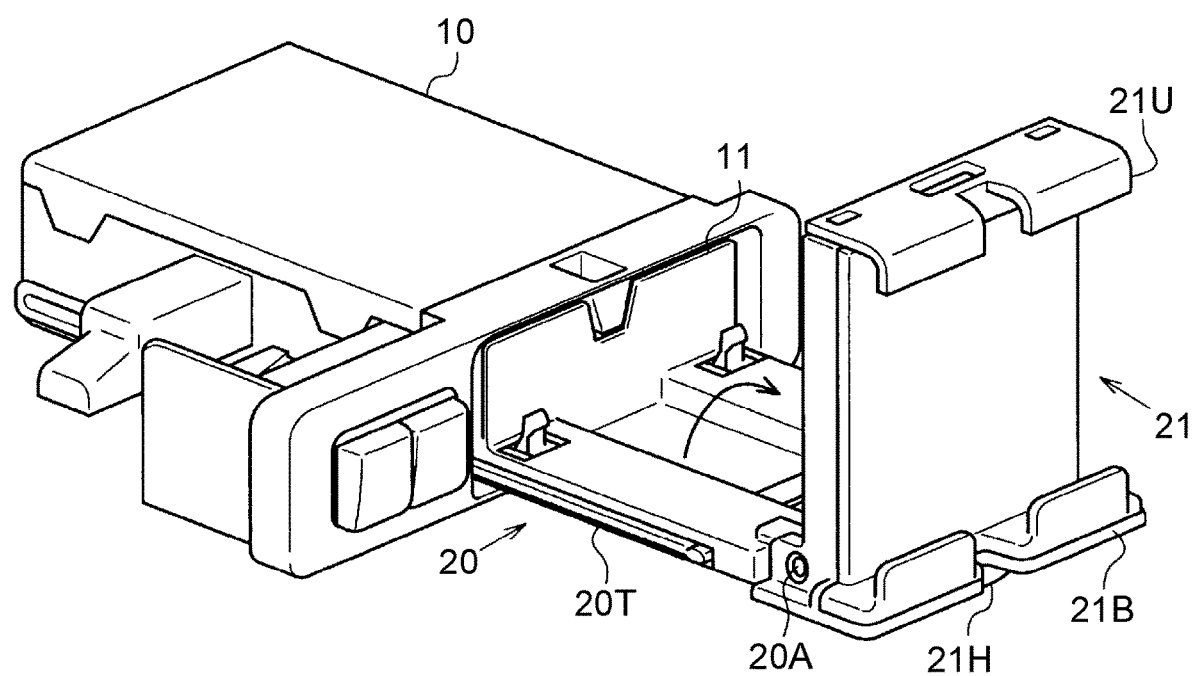
FIG. 2 is a view showing the structure in perspective view of the display holder in a pulled-out state.
Figure 3:
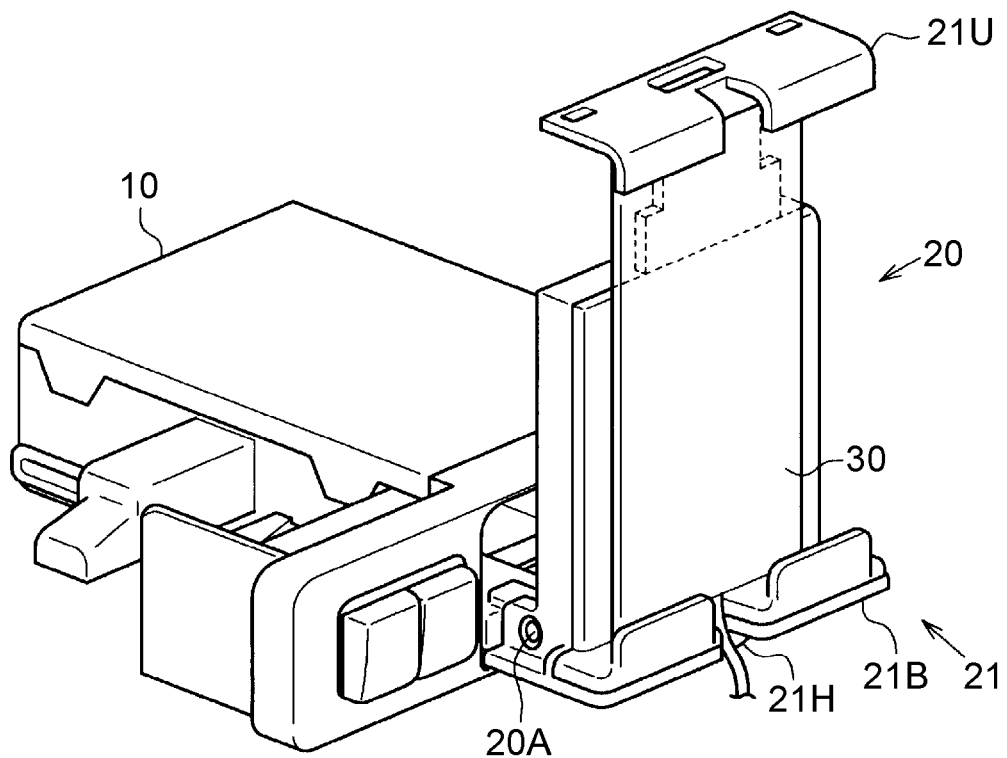
FIG. 3 is a view showing the structure in perspective view of the display holder in a state of holding a display.

FIG. 1 shows a state in which a display mounting stand is accommodated in an accommodating part. FIG. 2 shows a state in which the display mounting stand is pulled out from the accommodating part, and is displaced from a laid-down posture to an upright posture. FIG. 3 shows a state in which a display is placed on the display mounting stand in the upright posture.

As shown in FIG. 1, the accommodating part 10 has a box-like shape, and is fixed to an instrument panel of the vehicle. The accommodating part 10 has an aperture 11 in a quadrangular shape facing a vehicle cabin. The accommodating part 10 accommodates a display holder 20 used for placing the display thereon.

The display holder 20 includes a display mounting stand 21. The display mounting stand 21 has a shape filling the aperture 11 of the accommodating part 10. The display mounting stand 21 includes a handle 21H. The handle 21H has a half-bowl shape with an opening facing downward, and is designed to allow a finger or the like to be inserted in the handle from below. The handle 21H is used when the display mounting stand 21 is pulled out from the accommodating part 10, when the display mounting stand 21 is displaced from the laid-down posture to the upright posture, and when the display mounting stand 21 is pushed into the accommodating part 10.

As shown in FIG. 2, the display holder includes a translation base 20T. The translation base 20T has a dimension small enough to move through the aperture 11 of the accommodating part 10. The translation base 20T allows the display mounting stand 21 to be pulled out from the accommodating part 10 toward the vehicle cabin, and pushed in from the vehicle cabin into the accommodating part 10. The translation base 20T includes a rotating shaft 20A at an end of the translation base 20T located closer to the vehicle cabin. The display mounting stand 21 is coupled to the rotating shaft 20A of the translation base 20T in such a manner as to turn between the posture in which the display mounting stand 21 is laid down along the translation base 20T (laid-down posture) and the posture in which the display mounting stand 21 stands up (upright posture). The display mounting stand 21 is accommodated in the laid-down posture together with the translation base 20T in the accommodating part 10. The display mounting stand 21 is pulled out in the laid-down posture from the accommodating part 10, and is pushed into the accommodating part 10 also in the laid-down posture. The display mounting stand 21 is pulled out in the laid-down posture together with the translation base 20T from the accommodating part 10, and is then turned to be displaced to the upright posture.

As shown in FIG. 3, the display mounting stand 21 includes a lower holding portion 21B and an upper holding portion 21U. The lower holding portion 21B is coupled to the translation base 20T by the rotating shaft 20A. The upper holding portion 21U is configured to be displaceable in an up-down direction relative to the lower holding portion 21B. The display mounting stand 21 in the upright posture sandwiches the display 30 in the up-down direction by the lower holding portion 21B and the upper holding portion 21U. Note that while the display 30 is held in the display holder, the translation base 20T is pushed into the accommodating part 10 with the display mounting stand 21 maintained in the upright posture (from the state shown in FIG. 2). Next, the upper holding portion 21U of the display mounting stand 21 is once pulled up, and the display 30 is placed between the lower holding portion 21B and the upper holding portion 21U. Subsequently, the upper holding portion 21U is moved downward so as to abut to an upper edge of the display 30.

Figure 4:
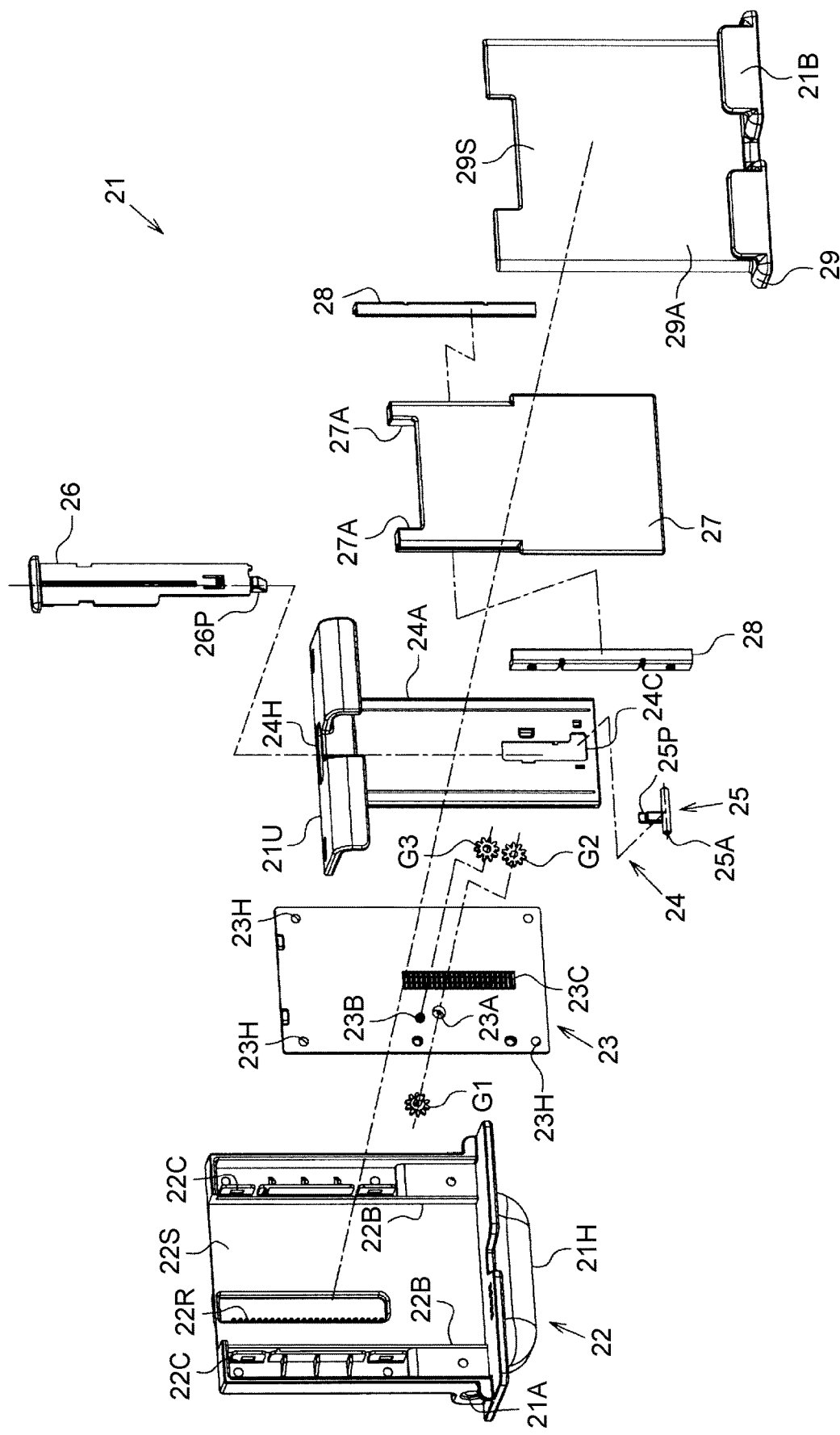
FIG. 4 is a view showing a structure in exploded perspective view of a display mounting stand.
Figure 5:
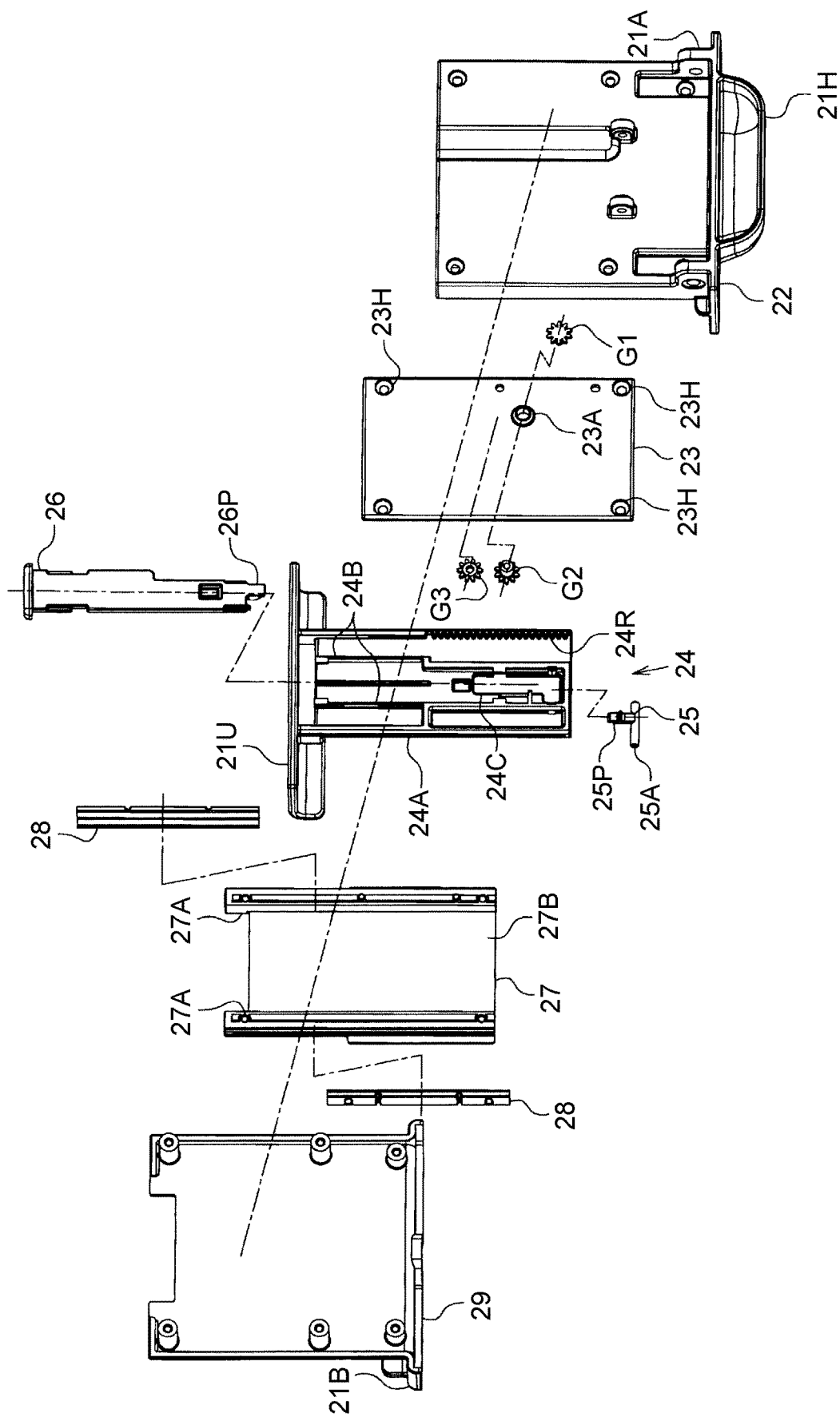
FIG. 5 is a view showing the structure in exploded perspective view of the display mounting stand.

Now, with reference to FIG. 4 and FIG. 5, the configuration of the display mounting stand 21 will be described. FIG. 4 shows a structure in exploded perspective view of the display mounting stand 21 in the upright posture when seen from the front surface side. FIG. 5 is a view showing the structure in exploded perspective view of the display mounting stand 21 in the upright posture when seen from the back surface side. Herein, description will be provided on the configuration of the display mounting stand 21 with reference to the upright posture.

The display mounting stand 21 includes a first support part 22, a first linear moving part 23, an arm 24, a second linear moving part 27, and a second support part 29. The first support part 22 and the second support part 29 each have a plate-like shape facing each other, and configure an integral holder. The first linear moving part 23 and the second linear moving part 27 each have a plate-like shape facing each other, and configure an integral rail. The integral rail is held between the first support part 22 and the second support part 29. The arm 24 has a plate-like shape held between the first linear moving part 23 and the second linear moving part 27. The first support part 22, the first linear moving part 23, the arm 24, the second linear moving part 27, and the second support part 29 are stacked from the back surface side in this order.

The first support part 22 has a plate-like shape, and includes the handle 21H and a rotating shaft 21A in a lower part. The first support part 22 includes, in the center of a right-left direction, a first accommodating portion 22S extending in the up-down direction. The first accommodating portion 22S is sectioned by a pair of right and left first guiding ribs 22B extending in the up-down direction. The first accommodating portion 22S accommodates the rail so as to be movable in the up-down direction.

The first accommodating portion 22S includes a recess that is recessed toward the back surface side and extends in the up-down direction, and the first accommodating portion 22S also includes a first rack 22R on a side wall of the recess. The side wall of the recess in the first accommodating portion 22S is a linear projection that extends in the up-down direction and projects toward the back surface side of the first accommodating portion 22S. The first rack 22R extends in the up-down direction along the side wall of the first accommodating portion 22S while teeth of the first rack 22R face the center of the right-left direction (inward) of the first accommodating portion 22S.

The first support part 22 includes a pair of second guiding ribs 22C that hold the first accommodating portion 22S therebetween on the right side and the left side. The second guiding ribs 22C project toward the second support part 29, and are disposed across the first support part 22 in the up-down direction. Gaps extending in the up-down direction are formed between the respective first guiding ribs 22B and the respective second guiding ribs 22C. The first guiding ribs 22B and the second guiding ribs 22C are one example of a rail restricting part. The rail restricting part restricts movement of the rail to linear movement along the up-down direction.

The first linear moving part 23 has a rectangular plate-like shape accommodatable in the first accommodating portion 22S. The first linear moving part 23 includes fastening holes 23H, a gear coupling hole 23A, a gear support hole 23B, and a third rack 23C.

The fastening holes 23H are located at four corners of the first linear moving part 23, and extend through the first linear moving part 23 in a thickness direction of first linear moving part 23. The first linear moving part 23 is fastened to the second linear moving part 27 via the fastening holes 23H. The gear coupling hole 23A is located in a corresponding portion facing the first rack 22R, and extends through the first linear moving part 23 in the thickness direction. A first gear G1 and a second gear G2 are coaxially coupled to each other via the gear coupling hole 23A. The first gear G1 is located between the first support part 22 and the first linear moving part 23, and meshes with the first rack 22R of the recess included in the first support part 22. The second gear G2 is located between the arm 24 and the first linear moving part 23. The gear support hole 23B is located in a surface of the first linear moving part 23, which faces the arm 24. A third gear G3 is located between the arm 24 and the first linear moving part 23, and is turnably fixed to the gear support hole 23B so as to mesh with the second gear G2. The third rack 23C is located substantially at the center in the right-left direction in the opposite surface of the first linear moving part 23.

The arm 24 includes an arm plate 24A and the upper holding portion 21U. The arm plate 24A has a plate-like shape with a narrower width in the right-left direction than that of the first linear moving part 23. The upper holding portion 21U is integrally formed with an upper end of the arm plate 24A. The arm 24 includes knob guiding ribs 24B (see FIG. 5), a lock fixing hole 24C, a knob insertion hole 24H, and a second rack 24R (see FIG. 5).

The knob guiding ribs 24B are located on the back surface of the arm plate 24A. The knob guiding ribs 24B project from the back surface of the arm plate 24A toward the first linear moving part 23, and extend in the up-down direction. The lock fixing hole 24C is located in a lower end portion of the arm plate 24A, and extends through the arm plate 24A in a thickness direction of the arm plate 24A. A lock 25 includes a rotating shaft 25A extending in the right-left direction, and a lock hook 25P upwardly extending from the rotating shaft 25A. The lock 25 is fixed to the lock fixing hole 24C so as to be turnable around the rotating shaft 25A. The lock 25 is urged toward the third rack 23C by an urging member, such as a coil spring, all the time.

The knob insertion hole 24H is formed to be through the upper holding portion 21U in the up-down direction. The knob insertion hole 24H allows communication of an upper portion of the upper holding portion 21U with the back surface of the arm plate 24A. A lock knob 26 has a plate-like shape extending in the up-down direction, and is inserted through the knob insertion hole 24H. The lock knob 26 includes a release hook 26P at a lower end, and is guided in the up-down direction by the pair of knob guiding ribs 24B. Push-in of the lock knob 26 into the knob insertion hole 24H allows the lock hook 25P and the release hook 26P to abut to each other, to thereby bring the lock hook 25P to be apart from the third rack 23C against the urging force acting on the lock hook 25P.

As shown in FIG. 5, the arm plate 24A includes side walls at both ends in the right-left direction of the back surface, the side walls extending in the up-down direction. The side walls of the arm plate 24A are linear projections projecting from the back surface of the arm plate 24A toward the first linear moving part 23 side. The second rack 24R is located on a side wall of the side walls included in the arm 24, and the side wall faces the third gear G3. The second rack 24R extends along the side wall of the arm plate 24A in the up-down direction while teeth of the second rack 24R face the center (inward) in the right-left direction of the arm plate 24A. The third gear G3 meshes with the second gear G2 and the second rack 24R.

When the arm 24 is pulled up relative to the first support part 22, the upward movement of the arm 24 is converted into a normal rotation of the first gear G1 through the meshing between the third gear G3 and the second gear G2. The normal rotation of the first gear G1 moves the first linear moving part 23 upward relative to the first support part 22 through the meshing between the first gear G1 and the first rack 22R. On the other hand, when the arm 24 is pushed downward relative to the first support part 22, the downward movement of the arm 24 is converted into a reverse rotation of the first gear G1 through the meshing between the third gear G3 and the second gear G2. The reverse rotation of the first gear G1 moves the first linear moving part 23 downward relative to the first support part 22 through the meshing between the first gear G1 and the first rack 22R. That is, the respective gears G1, G2, G3 and the respective racks 22R, 24R configure an interlocking mechanism to interlock movement in one direction of the rail relative to the holder with movement in the same direction of the arm relative to the rail.

The second linear moving part 27 includes a second accommodating portion 27B sectioned by a pair of guiding walls 27A on the right and the left. The guiding walls 27A are projections extending in the up-down direction, and the second accommodating portion 27B accommodates the arm plate 24A in such a manner as to be movable in the up-down direction. The pair of guiding walls 27A is one example of an arm restricting part. The arm restricting part restricts movement of the arm 24 to the linear movement along the up-down direction. The second linear moving part 27 includes a pair of guiding rails 28 so as to hold the pair of guiding walls 27A therebetween on the right side and the left side. The respective guiding rails 28 are inserted into corresponding gaps between the first guiding ribs 22B (see FIG. 4) and the second guiding ribs 22C (see FIG. 4) described above.

With reference to FIG. 4 again, the second support part 29 includes a front wall 29A and the lower holding portion 21B. The front wall 29A has a plate-like shape covering substantially the entire first support part 22, and is fixed to the first support part 22. The front wall 29A includes a support surface 29S serving as a front surface of the display mounting stand 21. The support surface 29S supports the back surface of the display. The lower holding portion 21B is integrally formed with the lower end of the front wall 29A.

Figure 6:
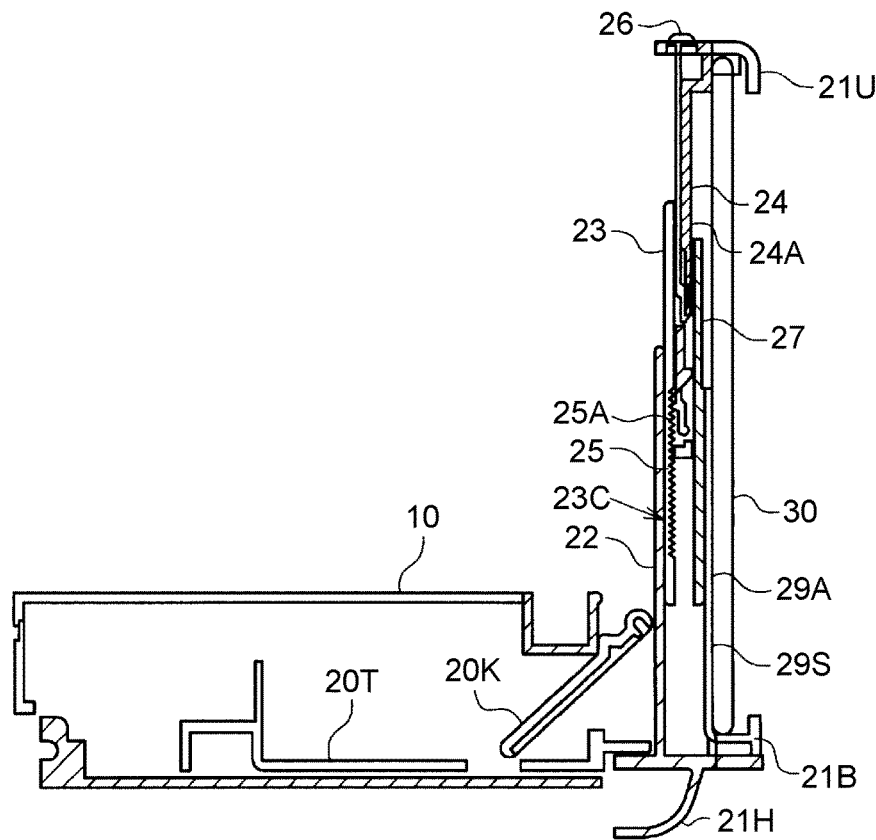
FIG. 6 is a view showing a side structure of the display mounting stand in a state of holding the display.

As shown in FIG. 6, the lock 25 is urged toward the third rack 23C all the time. When the lock knob 26 is pushed downward, the meshing between the lock 25 and the third rack 23C is released against the urging force acting onto the lock 25. The upper holding portion 21U is pulled up while the lock knob 26 is pushed down, and the display 30 is then placed between the lower holding portion 21B and the upper holding portion 21U. Subsequently, when the push-in of the lock knob 26 is released, the upper holding portion 21U is moved down such that the upper holding portion 21U abuts to the upper edge of the display 30. During the operation, the meshing between the lock 25 and the third rack 23C is repeated one step by one step, and the position of the upper holding portion 21U is then locked relative to the first linear moving part 23 (rail). Through the operation, the upper holding portion 21U is positioned at a position where the upper holding portion 21U abuts to the upper edge of the display 30. The lock 25 and the lock knob 26 are one example of a lock mechanism.

The display mounting stand 21 includes a support part 20K. The support part 20K is rotatably connected to a back surface of the first support part 22. When the display mounting stand 21 is in the laid-down posture, the support part 20K is in a posture along the back surface of the first support part 22. When the display mounting stand 21 is in the upright posture, the support part 20K is in a posture where a lower end of the support part 20K is in contact with an upper surface of the translation base 20T and is inclined relative to the back surface of the first support part 22. When the display mounting stand 21 in the upright posture is pushed into the aperture 11, the accommodating part 10 and the support part 20K come into contact with each other so as to restrict the rotation of the support part 20K. In the state in which the display mounting stand 21 in the upright posture is pushed into the accommodating part 10, the support part 20K keeps supporting the display mounting stand 21 in the upright posture.

Figure 7:
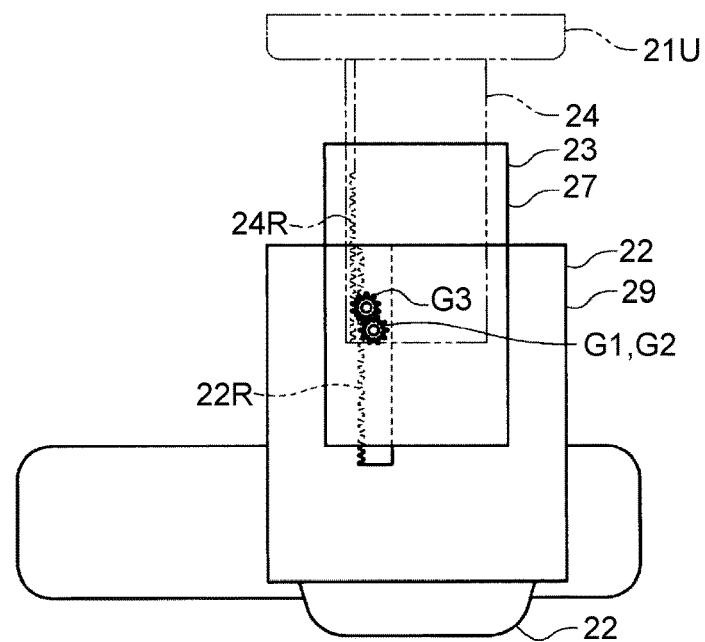
FIG. 7 is a view showing a structure in front view of the display mounting stand.

As shown in FIG. 7, the respective gears G1, G2, G3, and the respective racks 22R, 24R interlock the movement of the linear moving parts 23, 27 relative to the respective support parts 22, 29 in the up-down direction with the movement of the arm 24 relative to the linear moving parts 23, 27 in the same direction.

Now, when an impact is applied onto the display holder, such an impact acts on the respective linear moving parts 23, 27 (rail) such that the respective linear moving parts 23, 27 (rail) is bent toward the first support part 22 (back surface side) or the second support part 29 (front surface side). The impact also acts on the arm 24 such that the arm 24 is bent toward the first linear moving part 23 (back surface side) or the second linear moving part 27 (front surface side). With respect to the point, the first rack 22R and the second rack 24R are the side walls extending in the up-down direction, that is, the portions having resistance against the above bending. In particular, the respective side walls that are the linear projections are portions serving for suppressing bending in the first support part 22 and the arm 24. Accordingly, it is possible to suppress positional deviations of the first rack 22R and the second rack 24R relative to the respective gears G1, G2, G3.

As aforementioned, according to the above embodiment, the following effects can be obtained.

1) The meshing between the first rack 22R and the first gear G1 as well as the meshing between the second rack 24R and the third gear G3 are suppressed from being out of engagement, to thereby promote enhancement of impact resistance in the display holder.

2) The linear projections projecting in the thickness direction of the first support part 22 has a structure to suppress the above-described bending, and the linear projection projecting in the thickness direction of the arm 24 also has a structure to suppress the above-described bending. The respective side walls including the first rack 22R and the second rack 24R are configured as the linear projections, thus further enhancing effect equivalent to the above effect in 1).

3) The above-described bending in the first support part 22 encourages not a little deformation such that the first support part 22 is pulled and stretched in an extending direction of the first support part 22 and the first rack 22R is thus displaced toward the center side in the right-left direction. With respect to the point, since the teeth of the first rack 22R face the center side in the right-left direction, even in the event that bending occurs in the first support part 22, deformation due to the bending is likely to work to maintain the meshing between the first rack 22R and the first gear G1.

4) The above-described bending in the arm 24 encourages not a little deformation such that the arm 24 is pulled and stretched in an extending direction of the arm 24 and the second rack 24R is thus displaced toward the center side in the right-left direction. With respect to the point, since the teeth of the second rack 24R face the center side in the right-left direction, even in the event that bending occurs in the arm 24, deformation due to the bending is likely to work to maintain the meshing between the second rack 24R and the third gear G3.

5) The movement of the arm 24 relative to the respective linear moving parts 23, 27 is restricted to the linear movement along the up-down direction by the guiding walls 27A. The movement of the respective linear moving parts 23, 27 relative to the respective support parts 22, 29 is restricted to the linear movement along the up-down direction by the first guiding ribs 22B and the second guiding ribs 22C. Accordingly, it is possible to smoothly hold the display 30 by the respective support parts 22, 29 and the arm 24.

6) Because both of the movement direction of the arm 24 and the operation direction of the lock knob 26 that allows the movement extend along the up-down direction, the movement of the arm 24 and the movement of the linear moving parts 23, 27 interlocked with the movement of the arm 24 can be implemented by a user's intuitive operation.

The above-described embodiment can also be implemented by being changed as follow. The direction where the teeth of the first rack 22R face is not limited to the center side of the right-left direction, and may be the outward side of the right-left direction. The direction where the teeth of the second rack 24R face is not limited to the center side of the right-left direction, and may be the outward side of the right-left direction. The turning direction of the display mounting stand 21 when being displaced from the laid-down posture to the upright posture may be set to an opposite direction (downward direction on the front side of the drawing) to a direction indicated by an arrow shown in FIG. 2.

The configuration of supporting the display mounting stand 21 in the upright posture is not limited to using the above-described support part 20K, but the supporting may be carried out by abutment between the back surface of the display mounting stand 21 and the front surface of the accommodating part 10 by the push-in of the translation base 20T, for example. In the case, taking account of preserving the design property of the accommodating part 10, a buffer function using a buffer material or the like can be provided to the back surface of the display mounting stand 21.

What is claimed is:

1. A display holder comprising
a display mounting stand configured to be accommodatable in an accommodating part located in an instrument panel of a vehicle, the display mounting stand including:
    a holder including a first support part and a second support part, each of the first support part and the second support part is in a plate-like shape and faces each other;
    a rail held between the first support part and the second support part, the rail including a first linear moving part and a second linear moving part, each of the first linear moving part and the second linear moving part is in a plate-like shape and faces each other; and
    an arm in a plate-like shape and held between the first linear moving part and the second linear moving part,
    the holder and the arm being configured to hold a display between the holder and the arm,
    the first support part, the first linear moving part, the arm, the second linear moving part, and the second support part being stacked in the order,
    the display mounting stand further including a first gear, a second gear, and a third gear,
    the first gear being located between the first support part and the first linear moving part, the first gear meshing with a first rack included in the first support part,
    the second gear being located between to the arm and the first linear moving part, the second gear being coaxially coupled to the first gear through a hole extending through the first linear moving part,
    the third gear being located between the arm and the first linear moving part, the third gear meshing with the second gear and a second rack included in the arm so as to interlock movement in one direction of the rail relative to the holder with movement in the one direction of the arm relative to the rail,
    the first rack being located on a side wall extending in the one direction of the first support part, and
    the second rack being located on a side wall extending in the one direction of the arm.

2. The display holder according to claim 1, wherein
the side wall of the first support part includes a linear projection projecting in a thickness direction of the first support part, and
the side wall of the arm includes a linear projection projecting in a thickness direction of the arm.

3. The display holder according to claim 1, wherein
the first rack has teeth facing inward of the first support part, and
the second rack has teeth facing inward of the arm.

4. The display holder according to claim 1, wherein
the rail includes an arm restricting part that holds both sides of the arm and restricts movement of the arm to linear movement along the one direction, and
the holder includes a rail restricting part that holds both sides of the rail and restricts movement of the rail to linear movement along the one direction.

5. The display holder according to claim 1, further comprising a lock mechanism that locks a position of the arm relative to the rail and releases the lock by operation on an operating part along the one direction.

* * * * *

UNITED STATES PATENT AND TRADEMARK OFFICE
CERTIFICATE OF CORRECTION

| | | |
|---|---|---|
| PATENT NO. | : 10,569,719 B2 | Page 1 of 1 |
| APPLICATION NO. | : 16/262033 | |
| DATED | : February 25, 2020 | |
| INVENTOR(S) | : Takako Yamada et al. | |

It is certified that error appears in the above-identified patent and that said Letters Patent is hereby corrected as shown below:

On the Title Page

Item (73), country, delete "(KR)" and insert --(JP)--, therefor.

Signed and Sealed this
Twenty-eighth Day of April, 2020

Andrei Iancu
*Director of the United States Patent and Trademark Office*